(12) United States Patent
Fujita et al.

(10) Patent No.: US 11,959,539 B2
(45) Date of Patent: Apr. 16, 2024

(54) STRAIN WAVE GEAR DEVICE

(71) Applicant: KABUSHIKI KAISHA RIKEN, Tokyo (JP)

(72) Inventors: Satoru Fujita, Tokyo (JP); Kazuo Ishizuka, Tokyo (JP); Tomoki Shirasawa, Tokyo (JP); Ryo Kamiyama, Tokyo (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 18/262,378

(22) PCT Filed: Nov. 18, 2021

(86) PCT No.: PCT/JP2021/042499
§ 371 (c)(1),
(2) Date: Jul. 21, 2023

(87) PCT Pub. No.: WO2022/163083
PCT Pub. Date: Aug. 4, 2022

(65) Prior Publication Data
US 2024/0084884 A1    Mar. 14, 2024

(30) Foreign Application Priority Data
Jan. 26, 2021  (JP) ................... 2021-010600

(51) Int. Cl.
*F16H 55/08* (2006.01)
*F16H 49/00* (2006.01)
*F16H 55/06* (2006.01)

(52) U.S. Cl.
CPC ........ *F16H 55/0833* (2013.01); *F16H 49/001* (2013.01); *F16H 55/06* (2013.01)

(58) Field of Classification Search
CPC ..... F16H 55/0833; F16H 49/001; F16H 55/06
See application file for complete search history.

(56) References Cited

U.S. PATENT DOCUMENTS 7,836,786 B2 * 11/2010 Zhang .................. F16H 49/001
74/461

FOREIGN PATENT DOCUMENTS

| JP | S63243565 A | 10/1988 |
| JP | H02275166 A | 11/1990 |

(Continued)

OTHER PUBLICATIONS

Jul. 12, 2022, Decision to Grant a Patent issued by the Japan Patent Office in the corresponding Japanese Patent Application No. 2021-010600.

(Continued)

*Primary Examiner* — Terence Boes
(74) *Attorney, Agent, or Firm* — KENJA IP LAW PC (57) ABSTRACT

It is included an internal gear (2), an external gear (3) having flexibility, and a wave generator (4) that forms a meshing part (P) with the internal gear (2) in the external gear (3) and moves the meshing part (P) in a circumferential direction of the internal gear (2). The wave generator (4) is configured such that the meshing part (P) is formed at three or more positions in a circumferential direction of the external gear (3). A value ($Dp_F/Z_F$) obtained by dividing a working pitch diameter $Dp_F$ of the external gear (3) by the number of teeth $Z_F$ is greater than a value ($Dp_R/Z_R$) obtained by dividing a working pitch diameter $Dp_R$ of the internal gear (2) by the number of teeth $Z_R$.

4 Claims, 6 Drawing Sheets

(56) References Cited

FOREIGN PATENT DOCUMENTS

| JP | H0592557 U | 12/1993 |
| JP | H05332403 A | 12/1993 |
| JP | 2006046369 A | 2/2006 |
| JP | 2017166649 A | 9/2017 |
| JP | 2018025296 A | 2/2018 |
| JP | 2018159458 A | 10/2018 |

OTHER PUBLICATIONS

Jul. 31, 2023, International Preliminary Report on Patentability issued in the International Patent Application No. PCT/JP2021/042499.

Jan. 18, 2022, International Search Report issued in the International Patent Application No. PCT/JP2021/042499.

Feb. 3, 2024, Office Action issued by the China National Intellectual Property Administration in the corresponding Chinese Patent Application No. 202180091470.1.

* cited by examiner

STRAIN WAVE GEAR DEVICE

TECHNICAL FIELD

This disclosure relates to a strain wave gear device.

BACKGROUND

Conventionally, as a method of improving the power transmission efficiency of strain wave gear devices, for example, focusing on the mesh of an internal gear and an external gear, the tooth profile of the internal gear and the tooth profile of the external gear are set (see, for example, PTLs 1 and 2).

A conventional strain wave gear device includes a wave generator having a three-lobe shape, in which a meshing part of the internal gear and the external gear is provided at three positions (see, for example, PTL 3). A strain wave gear device having the meshing part at three or more positions is effective for improving the rigidity against torsion.

CITATION LIST

Patent Literature

PTL 1: JP2017166649A
PTL 2: JP2018159458A
PTL 3: JPWO2018025296A

SUMMARY

Technical Problem

However, when the meshing part is provided at three or more positions, large deformation occurs at each of the external gear having flexibility and an elastically deforming bearing that constitutes a part of the wave generator. Therefore, the strain wave gear device having three or more meshing parts still have room for improvement in power transmission efficiency.

It could be helpful to provide a strain wave gear device with improved power transmission efficiency while increasing the rigidity of the strain wave gear device as a whole.

Solution to Problem

A strain wave gear device according to this disclosure includes: an internal gear; an external gear that has flexibility and is arranged at an inner circumference side of the internal gear; and a wave generator that is assembled to an inner circumference of the external gear to cause the external gear to noncircularly deflect to form a meshing part with the internal gear in the external gear and to move the meshing part in a circumferential direction of the internal gear, wherein the wave generator is configured such that the meshing part is formed at three or more positions in a circumferential direction of the external gear, and in a state before the external gear is assembled to the wave generator, a value $(Dp_F/Z_F)$ obtained by dividing a working pitch diameter $Dp_F$ of the external gear by the number of teeth $Z_F$ of the external gear is greater than a value $(Dp_R/Z_R)$ obtained by dividing a working pitch diameter $Dp_R$ of the internal gear by the number of teeth $Z_R$ of the internal gear. The strain wave gear device according to this disclosure can improve the power transmission efficiency by decreasing a deformation amount required for meshing, while increasing the rigidity of the strain wave gear device as a whole.

In the strain wave gear device according to this disclosure, it is preferable that a tip diameter $Da_R$, a root diameter $Dd_R$, and the number of teeth $Z_R$ of the internal gear; a tip diameter $Da_F$, a root diameter $Dd_F$, and the number of teeth $Z_F$ of the external gear; and a lift amount D of a working pitch circle of the external gear, the lift amount D being generated by assembling the external gear to the wave generator, satisfy a relation of:

$$1 < Z_R \cdot (Da_R + Dd_R + Da_F + Dd_F - 4D)/Z_F \cdot (Da_R + Dd_R + Da_F + Dd_F + 4D)\} \le 1.11.$$

This case can improve the power transmission efficiency while ensuring the meshing part at three or more positions.

In the strain wave gear device according to this disclosure, at least one of the internal gear or the external gear can use a material containing a resin material. This case can achieve the weight saving of the strain wave gear device and reduce the cost of the strain wave gear device.

In the strain wave gear device according to this disclosure, it is preferable that teeth of at least one of the internal gear or the external gear are subjected to a friction reduction treatment. This case can more improve the power transmission efficiency.

Advantageous Effect

This disclosure can provide a strain wave gear device with improved power transmission efficiency while increasing the rigidity of the strain wave gear device as a whole.

DETAILED DESCRIPTION

With reference to the drawings, a strain wave gear device, one of the disclosed embodiments will be described below.

Figure 1:
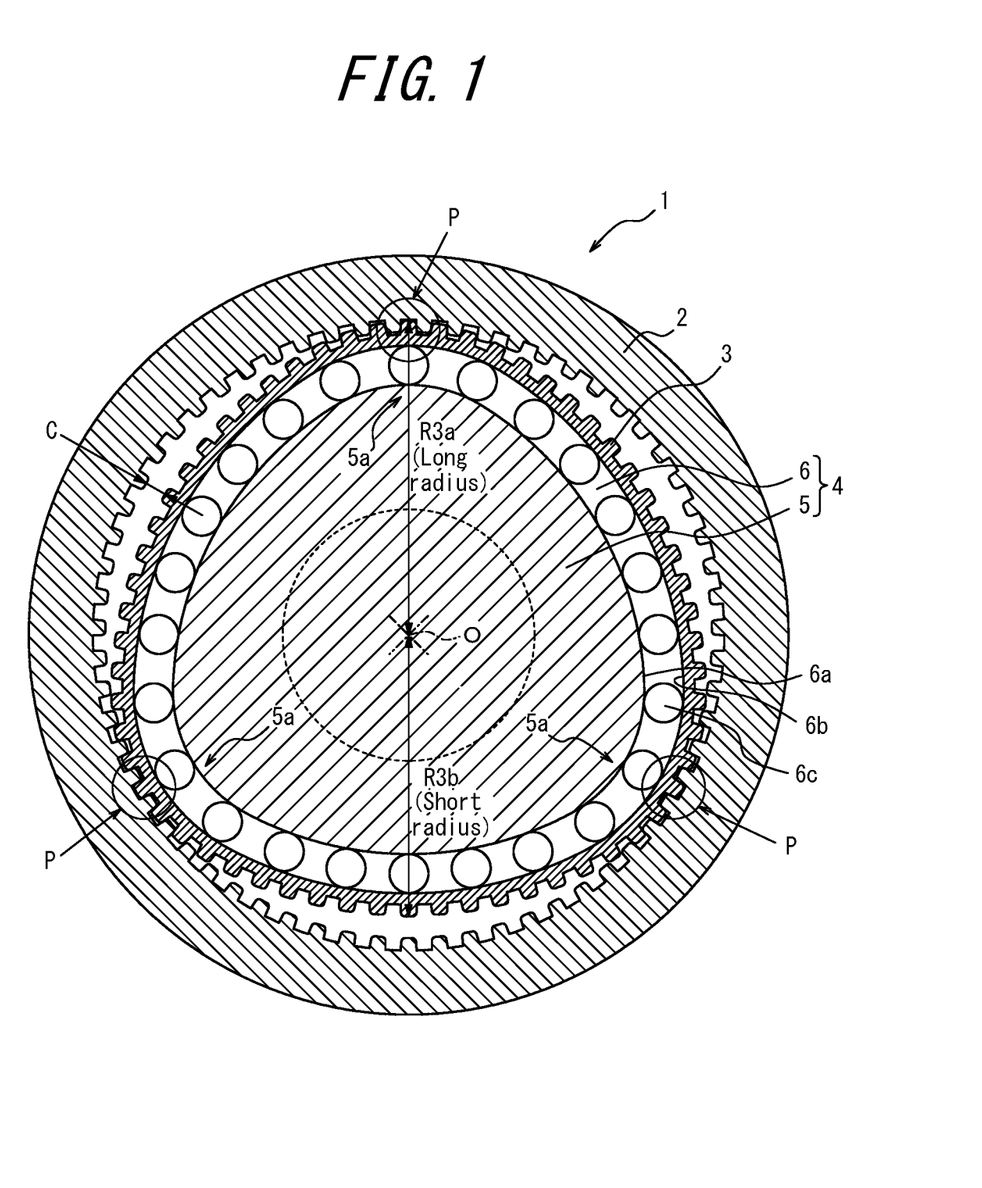
FIG. 1 is a schematic view of a strain wave gear device, one of the disclosed embodiments.

In FIG. 1, a reference sign 1 denotes a strain wave gear device, one of the disclosed embodiments. The strain wave gear device 1 includes an internal gear 2, an external gear 3 that has flexibility and is arranged on the inner circumference side of the internal gear 2, and a wave generator 4. The wave generator 4 is assembled to the inner circumference of the external gear 3 to noncircularly deflect the external gear 3 to form a meshing part P with the internal gear 2 in the external gear 3 and to move the meshing part P in the circumferential direction of the internal gear 2.

The wave generator 4 is configured such that the meshing part P is formed at three or more positions in the circumferential direction of the external gear 3. With reference to FIG. 1, in this embodiment, the external gear 3 has three meshing parts P. In this embodiment, the internal gear 2 and the external gear 3 are coaxially arranged with an axis O as an identical axis. That is, in this embodiment, the circumferential directions of the internal gear 2 and the external gear 3 match the direction around the axis O.

Figure 2:
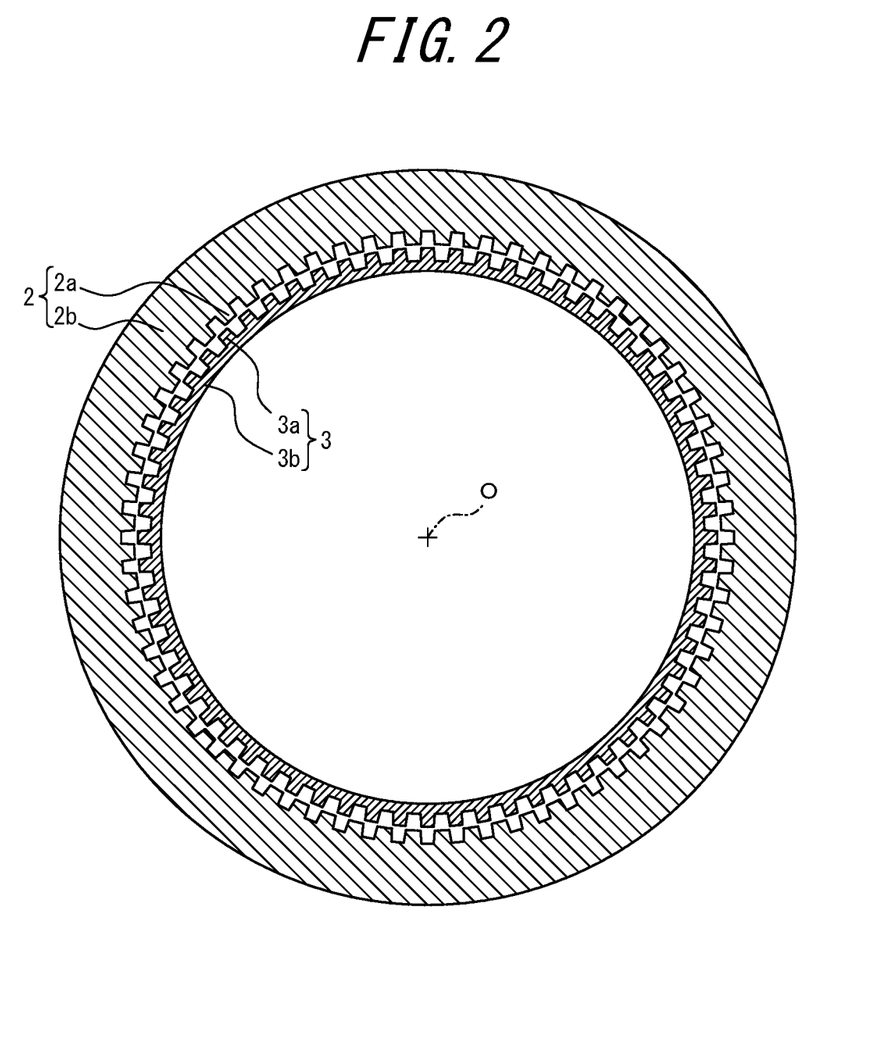
FIG. 2 is a schematic view of an internal gear and an external gear in a state before the external gear is assembled to a wave generator.

FIG. 2 is a schematic view of the internal gear 2 and the external gear 3 in a state before the external gear 3 is assembled to the wave generator 4.

With reference to FIG. 2, the internal gear 2 has a plurality of internal teeth 2a and an annular body 2b. The plurality of internal teeth 2a protrude from the inner circumference of the annular body 2b to the inside in the radial direction. In this embodiment, the internal gear 2 is fixed to, for example, the housing of the strain wave gear device 1. That is, in this embodiment, the internal gear 2 is a fixed gear. Furthermore, in this embodiment, the internal gear 2 is a rigid gear having high rigidity. The internal gear 2 is formed of, for example, ferrous materials such as cast iron, alloy steel, and carbon steel; light metal materials such as magnesium alloy, aluminum alloy, and titanium alloy; or resin materials such as engineering plastics such as PEEK, PPS, and POM.

With reference to FIG. 2, the external gear 3 has a plurality of external teeth 3a and an annular body 3b. The plurality of external teeth 3a protrude from the outer circumference of the annular body 3b to the outside in the radial direction. The external gear 3 is a flexible gear having flexibility. The external gear 3 can be mechanically deformed and restored by, for example, thinly forming the annular body 3b. When the annular body 3b is thinly formed, the material of which the external gear 3 is formed can be metal or a resin material. The external gear 3 can be materially deformed and restored using, for example, a material having flexibility (for example, thin materials formed of alloy steel, carbon steel, or light metal, or resin materials such as engineering plastics).

With reference to FIG. 1 again, in this embodiment, the wave generator 4 includes a wave generation core 5 and an elastically deforming bearing 6.

The wave generation core 5 is connected to a power source such as a motor (illustration omitted). The wave generation core 5 functions as, for example, a cam. In this embodiment, the axis of rotation of the motor is coaxial with the axis O. This can cause the wave generation core 5 to rotate around the axis O. The wave generation core 5 has a noncircular shape. In this embodiment, the wave generation core 5 has a shape having three tops 5a that are convex outward in the radial direction, what is called, a three-lobe shape. In this embodiment, the wave generation core 5, like the internal gear 2, is a member having high rigidity.

The elastically deforming bearing 6 allows relative rotation between the inner circumference of the external gear 3 and the outer circumference of the wave generation core 5. In this embodiment, the elastically deforming bearing 6 is a ball bearing having an inner ring 6a, an outer ring 6b, and balls 6c. The ball bearing includes, for example, a deep groove ball bearing. In this embodiment, the inner ring 6a and the outer ring 6b have flexibility. This can cause the inner ring 6a and the outer ring 6b to each deform to fit the contour shape of a member to be attached.

The inner ring 6a of the elastically deforming bearing 6 is attached to the outer circumference of the wave generation core 5. This causes the elastically deforming bearing 6 to be assembled to the wave generation core 5 such that the shape of the elastically deforming bearing 6 fits the contour shape of the wave generation core 5. The outer ring 6b of the elastically deforming bearing 6 is attached to the inner circumference of the external gear 3. The external gear 3 has flexibility. This causes the external gear 3 to be assembled to the wave generation core 5 via the elastically deforming bearing 6 such that the shape of the external gear 3 fits the contour shape of the wave generation core 5. Accordingly, in this embodiment, the external gear 3 deflects into a noncircular three-lobe shape according to the outer circumference shape of the wave generation core 5, as illustrated in FIG. 1. This forms the meshing part P with the internal gear 2 in the external gear 3, at three positions in the circumferential direction of the external gear 3, at intervals of 120 degrees.

In the strain wave gear device 1, when the wave generator 4 is rotated, the wave generation core 5 in the wave generator 4 can be rotated relative to the external gear 3. In the strain wave gear device 1, there is a difference in the number of teeth between the number of teeth $Z_F$ of the external teeth 3a of the external gear 3 and the number of teeth $Z_R$ of the internal teeth 2a of the internal gear 2. Therefore, when the wave generator 4 is rotated, relative rotation due to the difference in the number of teeth occurs between the internal gear 2 and the external gear 3. In this embodiment, the internal gear 2 is fixed. Thus, when the wave generator 4 is rotated, the meshing part P in the external gear 3 moves in a direction opposite to the rotation direction of the wave generator 4, in the circumferential direction of the internal gear 2. In this embodiment, the meshing part P moves in the direction opposite to the rotation direction of the wave generator 4 with respect to the internal gear 2 every time the wave generation core 5 rotates 120 degrees around the axis O. That is, in this embodiment, an input rotation from the wave generator 4 is reversely output as a reduction rotation from the external gear 3.

Figure 3:
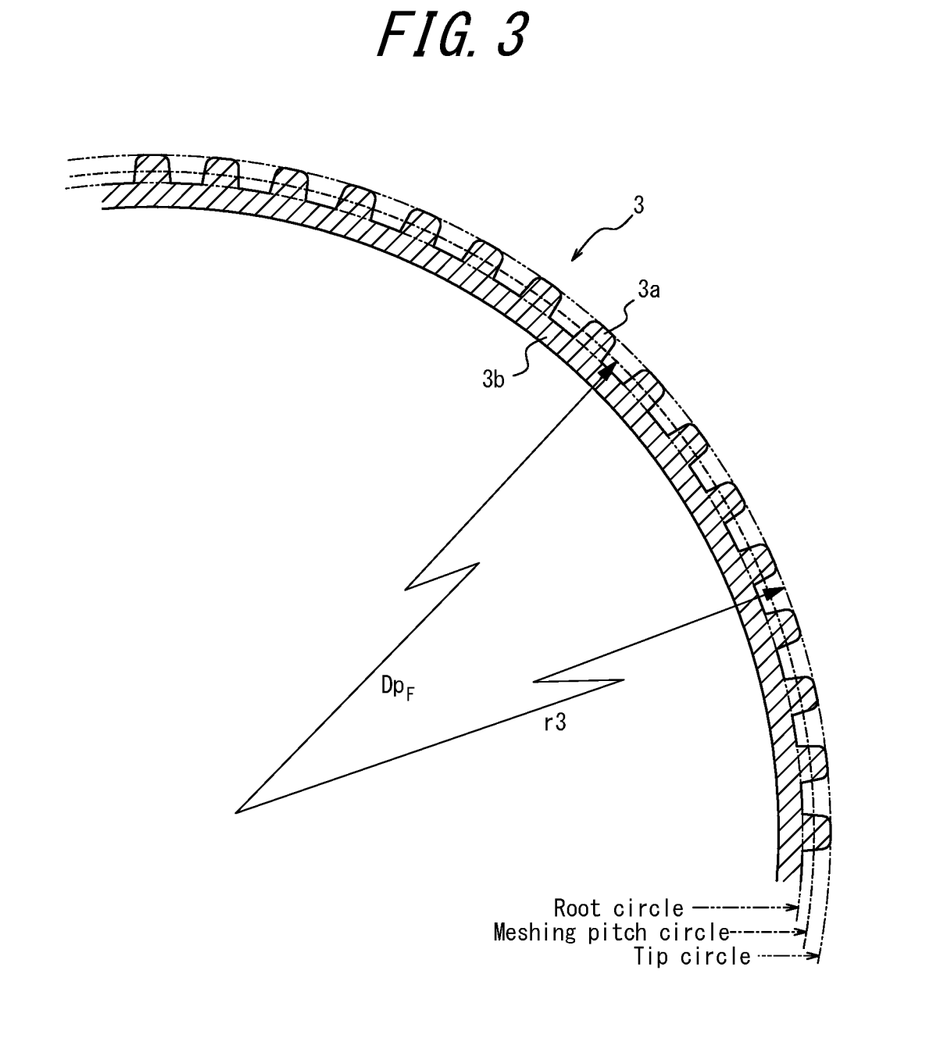
FIG. 3 is an enlarged view of a part of the external gear in FIG. 2.

FIG. 3 is an enlarged view of a part of the external gear 3 in FIG. 2. FIG. 3 illustrates the tip circle, root circle and working pitch circle of the external gear 3, in a state where the external gear 3 is annular. In FIG. 3, a reference sign $Dp_F$ denotes the working pitch diameter of the external gear 3.

Figure 4:
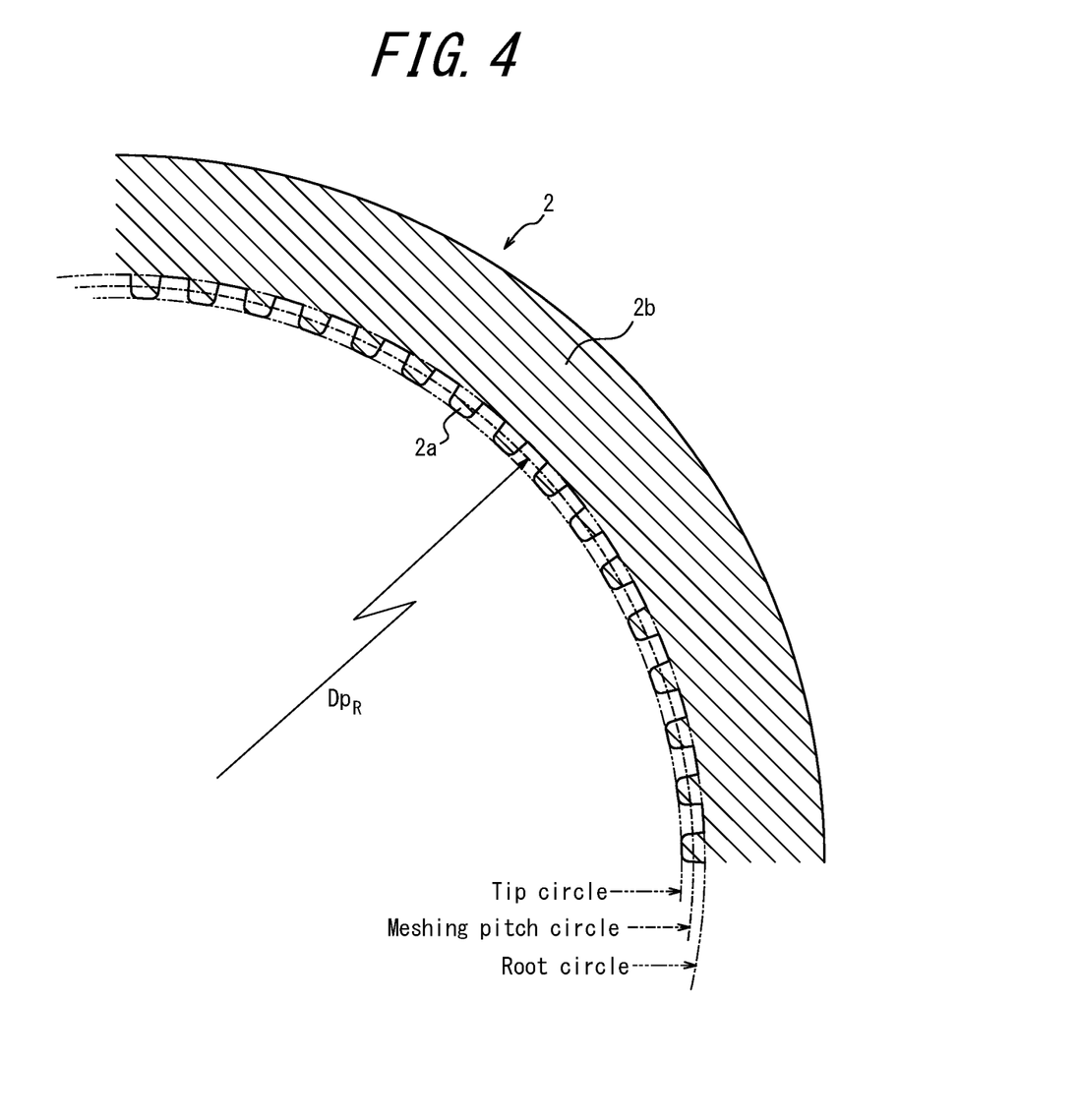
FIG. 4 is an enlarged view of a part of the internal gear in FIG. 2.

FIG. 4 is an enlarged view of a part of the internal gear 2 in FIG. 2. FIG. 4 illustrates the tip circle, root circle, and working pitch circle of the internal gear 2. In FIG. 4, a reference sign $Dp_R$ denotes the working pitch diameter of the internal gear 2.

As illustrated in FIG. 2, in the state before the external gear 3 is assembled to the wave generator 4, a value ($Dp_F/Z_F$) obtained by dividing the working pitch diameter $Dp_F$ of the external gear 3 by the number of teeth $Z_F$ of the external gear 3 is greater than a value ($Dp_R/Z_R$) obtained by dividing the working pitch diameter $Dp_R$ of the internal gear 2 by the number of teeth $Z_R$ of the internal gear 2. This is expressed in the following mathematical formula.

$$Dp_F/Z_F > Dp_R/Z_R \tag{1}$$

Conventional strain wave gear devices do not focus on the relation between the working pitch diameter $Dp_R$ of the internal gear 2 and the working pitch diameter $Dp_F$ of the external gear 3.

In contrast, the strain wave gear device 1 of this embodiment is a novel strain wave gear device configured based on the relation between the working pitch diameter $Dp_R$ of the internal gear 2 and the working pitch diameter $Dp_F$ of the external gear 3. The strain wave gear device 1 specifically produces the following effects.

As illustrated in FIG. 1, according to the strain wave gear device 1 of this embodiment, the meshing part P is provided at three or more (in this embodiment, three) positions. Accordingly, in this embodiment, the number of meshing place of the internal gear 2 and the external gear 3 is greater than that of a strain wave gear device having the meshing part P at two positions, what is called, a two-lobe shape. That is, the strain wave gear device having a shape with three or more lobes increases the meshing place of the whole of the strain wave gear device 1, compared with the strain wave gear device having a two-lobe shape. The strain wave gear device having a shape with three or more lobes increases the meshing place of the whole of the strain wave gear device to average the processing accuracy of the gear as a whole. Accordingly, the wave gear device having a shape with three or more lobes improves the accuracy of angular transmission performed by the strain wave gear device. Furthermore, according to the strain wave gear device having a shape with three or more lobes, the meshing part P at three or more (in this embodiment, three) positions reduces torsion that occurs in the whole of the strain wave gear device. That is, the strain wave gear device having a shape with three or more lobes can increase the rigidity against the torsion that occurs in the whole of the strain wave gear device.

Accordingly, the strain wave gear device 1 having a shape with three or more lobes can improve angular transmission accuracy and impact resistance, compared with the strain wave gear device having the meshing part P at two positions. Specifically, the meshing part P at three or more positions can increase the rigidity against the torsion that may occur on the external gear 2 and the rigidity against the torsion that may occur on the elastically deforming bearing 6 that constitutes a part of the wave generator 4, compared with the strain wave gear device having the meshing part P at two positions. Thus, the strain wave gear device 1 can improve angular transmission accuracy and impact resistance, compared with the strain wave gear device having the meshing part P at two positions.

On the other hand, with reference to FIG. 1, in the case of the strain wave gear device having a shape with three or more lobes, the deformation that occurs on the elastically deforming bearing 6 is deformation with a small radius of curvature, that is, large bending deformation, at the meshing part P. In this case, large bending stress occurs in the elastically deforming bearing 6. Accordingly, the durability of the elastically deforming bearing 6 and thus the durability of the strain wave gear device have room for improvement. Such large bending deformation greatly changes the orbit of the balls 6c in the elastically deforming bearing 6. Therefore, in the strain wave gear device having a shape with three or more lobes, resistance that occurs due to the movement of the balls 6c increases. That is, the strain wave gear device having a shape with three or more lobes still has room for improvement in power transmission efficiency of the strain wave gear device.

In contrast, according to the strain wave gear device 1 of this embodiment, configuring the internal gear 2 and the external gear 3 to satisfy Formula (1) above can decrease the deformation that occurs on the elastically deforming bearing 6. Thus, the strain wave gear device 1 of this embodiment can improve the power transmission efficiency, compared with the strain wave gear device having a shape with three or more lobes, which is not configured to satisfy Formula (1) above. Specifically, configuring the internal gear 2 and the external gear 3 to satisfy Formula (1) above can reduce the amount of the deformation that may occur on the external gear 3 and the amount of the deformation that may occur on the elastically deforming bearing 6, compared with the strain wave gear device having the meshing part P at two positions. Thus, the strain wave gear device 1 can improve the power transmission efficiency, compared with the strain wave gear device having a shape with three or more lobes, which is not configured to satisfy Formula (1) above.

Accordingly, the strain wave gear device 1 of this embodiment can improve the power transmission efficiency while increasing the rigidity of the strain wave gear device as a whole.

In this embodiment, it is preferable that the tip diameter $Da_R$, the root diameter $Dd_R$, and the number of teeth $Z_R$ of the internal gear 2; the tip diameter $Da_F$, the root diameter $Dd_F$, and the number of teeth $Z_F$ of the external gear 3; and a lift amount D (see FIG. 1) of the working pitch circle of the external gear 3, which is generated by assembling the external gear 3 to the wave generator 4, satisfy the following relation. For example, with reference to FIGS. 1 and 2, the lift amount D is a difference between the radius of the tip circle (long radius R3a in FIG. 1) of the external teeth 3a, at the long axis portion of the external gear 3, when the wave generator 4 is inserted into the inner circumference of the external gear 3, and the radius of the tip circle (radius r3 of the tip circle in FIG. 2) of the external teeth 3a, of the external gear 3 in a true circle state before the wave generator 4 is inserted into the inner circumference of the external gear 3.

$$1 < \{Z_R \cdot (Da_R + Dd_R + Da_F + Dd_F - 4D)\} / Z_F \cdot (Da_R + Dd_R + Da_F + Dd_F + 4D)\} \leq 1.11 \quad (2)$$

When the relation in Formula (2) is satisfied, the power transmission efficiency can be improved while ensuring the meshing part at three or more positions.

In general, the working pitch diameter $Dp_R$ of the internal gear 2 and the working pitch diameter $Dp_F$ of the external gear 3 are expressed by Formula (3a) to Formula (6b).

The following formulas are basic formulas for calculating the working pitch diameter $Dp_R$ of the internal gear 2 and the working pitch diameter $Dp_F$ of the external gear 3.

$$\text{External gear:} Dp_F = (Da_R + Dd_R + Da_F + Dd_F)/4 - D \quad (3a)$$

$$\text{Internal gear:} Dp_R = (Da_R + Dd_R + Da_F + Dd_F)/4 + D \quad (3b)$$

The following formulas are other formulas for calculating the working pitch diameter $Dp_R$ of the internal gear 2 and the working pitch diameter $Dp_F$ of the external gear 3.

$$\text{External gear:} Dp_F = Da_F - 2 \cdot f_{ha} \cdot m = (Da_R + Da_F)/2 - D \quad (4a)$$

$$\text{Internal gear:} Dp_R = Da_R + 2 \cdot f_{ha} \cdot m = (Da_R + Da_F)/2 + D \quad (4b)$$

The following formulas are other formulas for calculating the working pitch diameter $Dp_R$ of the internal gear 2 and the working pitch diameter $Dp_F$ of the external gear 3.

$$\text{External gear:} Dp_F = Dd_F + 2 \cdot f_{hd} \cdot m = (Dd_R + Dd_F)/2 - D \quad (5a)$$

$$\text{Internal gear:} Dp_R = Dd_R - 2 \cdot f_{hd} \cdot m = (Dd_R + Dd_F)/2 + D \quad (5b)$$

Furthermore, the working pitch circumferential length of the internal gear 2 and the working pitch circumferential length of the external gear 3 can be expressed as follows.

$$\text{Working pitch circumferential length of the external gear } 3 \text{:} \pi \cdot Dp_F \quad (6a)$$

$$\text{Working pitch circumferential length of the internal gear } 2 \text{:} \pi \cdot Dp_R \quad (6b)$$

In Formula (6a) and Formula (6b), π is the ratio of a circle's circumference.

Furthermore, the spacing of the internal teeth 2a of the internal gear 2 and the spacing of the external teeth 3a of the external gear 3 can be expressed as follows.

$$\text{Spacing of the teeth } 3a \text{ of the external gear } 3 \text{:} \pi \cdot Dp_F / Z_F = \pi \cdot (m_3 + 2 \cdot x_F \cdot m_3 / Z_F) \quad (7a)$$

Spacing of the teeth $2a$ of the internal gear $2$:$\pi \cdot Dp_R / Z_R = \pi \cdot (m_2 - 2 \cdot x_R \cdot m_2 / Z_R)$ \hfill (7b)

In Formula (7a) and Formula (7b), $\pi$ is the ratio of a circle's circumference. Accordingly, in Formula (7a) and Formula (7b), $\pi$ is common. In Formula (7a), $m_3$ is the module of the external gear 3. In Formula (7b), $m_2$ is the module of the internal gear 2. The internal gear 2 and the external gear 3 are assumed to mesh with one another. Thus, the module $m_2$ and the module $m_3$ are common ($m_2 = m_3$) as is the ratio of a circle's circumference $\pi$. Note that $x_F$ is the profile shift coefficient of the teeth $3a$ of the external gear 3. Moreover, $x_R$ is the transfer coefficient of the teeth $2a$ of the internal gear 2.

That is, under the conditions that Formula (1) holds, as is clear from Formula (7a) and Formula (7b), the spacing of the external teeth $3a$ of the external gear 3 is wider than the spacing of the internal teeth $2a$ of the internal gear 2, in the strain wave gear device of this disclosure. That is, when the external gear 3 is incorporated into the strain wave gear device 1 as one component of the strain wave gear device 1, the external gear 3 will mesh with the internal gear 2 with the meshing position of the external teeth $3a$ of the external gear 3 shifted to the tip direction (direction closer to the internal gear 2). Accordingly, the lift amount D of the working pitch circle may be a small value. That is, this disclosure can make the lift amount D of the working pitch circle a small value to reduce the deformation amount required for meshing, resulting in improvement in the power transmission efficiency of the strain wave gear device 1.

As one example that Formula (1) holds, in the case of $m_2 = m_3$, a profile shift coefficient that satisfies $x_F / Z_F + x_R / Z_R > 0$ may be applied to the internal gear 2 and the external gear 3.

Furthermore, it is preferable that the upper limit of a parameter $X = (Dp_F / Z_F) \, Dp_R / Z_R)$ is $X = 1.11$.

When Formula (1) above is divided by $(Dp_R / Z_R)$, the parameter X is as follows:

$$X > 1 \qquad (8)$$

Figure 5:
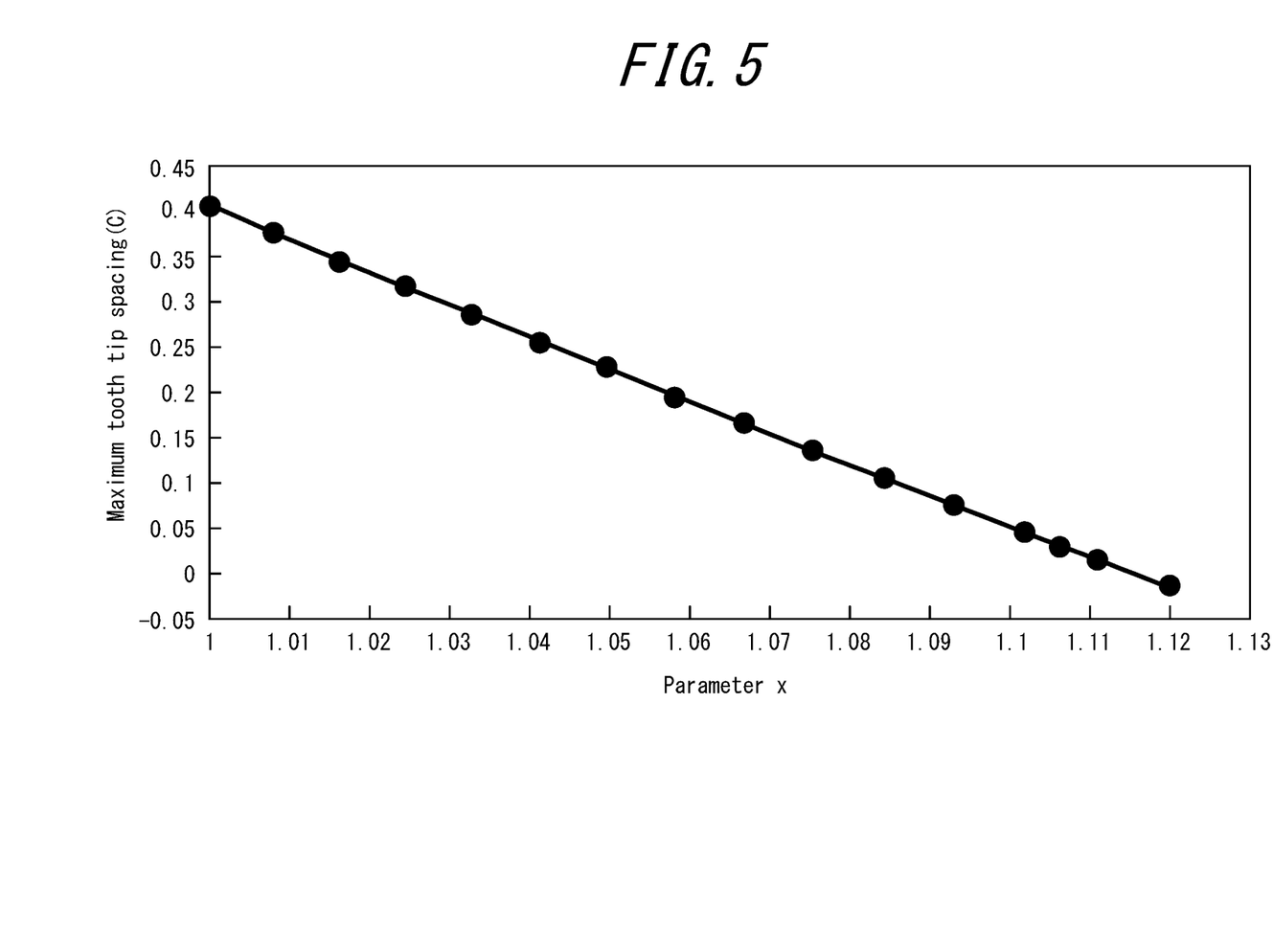
FIG. 5 is a graph that indicates a tooth tip spacing C versus a parameter X when a working pitch diameter $Dp_R$ of the internal gear and a working pitch diameter $Dp_F$ of the external gear are varied.

Next, with reference to FIG. 1, in a case where the maximum spacing (hereinafter, referred to as the "maximum tooth tip spacing") of the clearance in the radial direction between the tips of the internal teeth $2a$ of the internal gear 2 and the tips of the external teeth $3a$ of the external gear 3, between the meshing parts P in the circumferential direction of the external gear 3 is C, and the working pitch diameter $Dp_R$ of the internal gear 2 and the working pitch diameter $Dp_F$ of the external gear 3 are varied, the relation between the maximum tooth tip spacing C and the parameter X was calculated. FIG. 5 is a graph that indicates the calculation result with the relation between the maximum tooth tip spacing C and the parameter X.

In the above calculation, the module m of the gear is equal, m=0.3, in the module $m_2$ of the internal gear 2 and the module $m_3$ the external gear 3. The number of teeth $Z_F$ of the external teeth $3a$ of the external gear 3 is $Z_F = 48$. The number of teeth $Z_R$ of the internal teeth $2a$ of the internal gear 2 is $Z_R = 51$. The addendum coefficient $f_{ha}$ of the gear is equal, $f_{ha} = 1$, in the addendum coefficient $f_{ha2}$ of the internal teeth $2a$ of the internal gear 2 and the addendum coefficient $f_{ha3}$ of the external teeth $3a$ of the external gear 3. The dedendum coefficient $f_{hd}$ of the gear is equal, $f_{hd} = 1.25$, in the dedendum coefficient $f_{ha2}$ of the internal teeth $2a$ of the internal gear 2 and the dedendum coefficient $f_{ha3}$ of the external teeth $3a$ of the external gear 3.

With reference to the graph in FIG. 5, when the vertical axis is 0 (zero), the maximum tooth tip spacing C is C=0 (zero), which means that the tips of the internal teeth $2a$ of the internal gear 2 will butt against the tips of the external teeth $3a$ of the external gear 3 even in a part where clearance should be normally generated. With reference to FIG. 1, when the parameter X approaches X=1.11, the radius of the tip circle (short radius R3$b$ in FIG. 1) of the external teeth $3a$ at the short axis portion of the external gear 3 when the wave generator 4 is inserted into the inner circumference of the external gear 3 increases, which decreases the maximum clearance C in the radial direction. That is, when the vertical axis is 0 (zero), the tips of the internal teeth $2a$ of the internal gear 2 and the tips of the external teeth $3a$ of the external gear 3 will interfere with one another at the part other than the meshing part P. Therefore, when the maximum clearance C in the radial direction is C=0 (zero), the strain wave gear device 1 no longer functions. With reference to FIG. 5, when the parameter X exceeds X=1.11, the vertical axis becomes 0 or less. Accordingly, when Formula (2) above is satisfied, the meshing part P at three or more positions can be ensured. Thus, when the relation in Formula (2) is satisfied, the power transmission efficiency can be improved while ensuring the meshing part at three or more positions.

Figure 6:
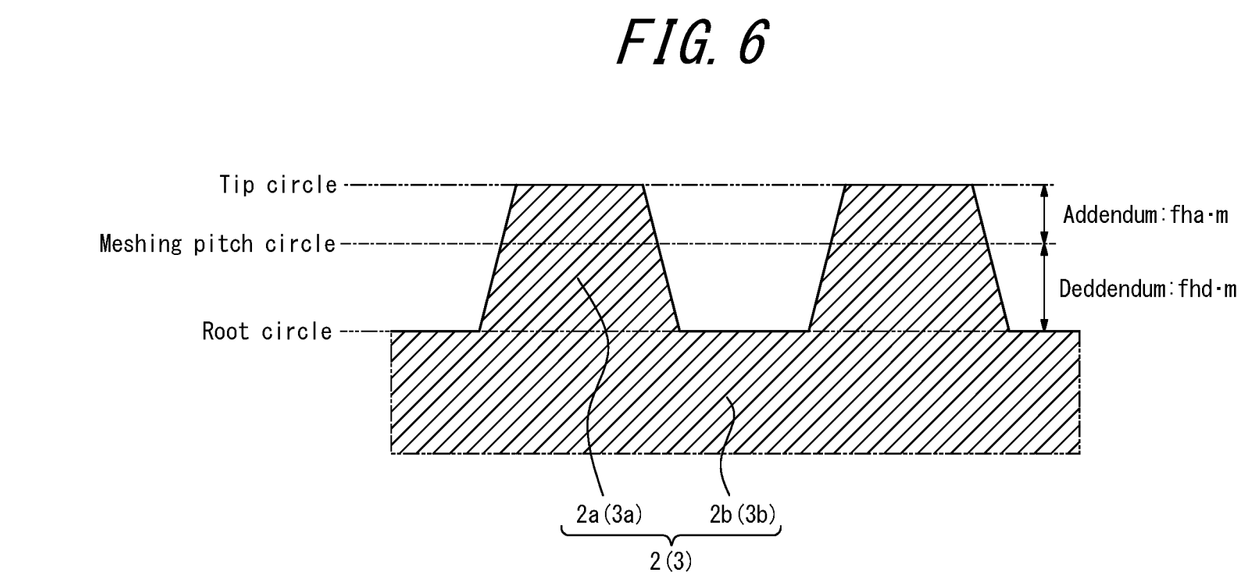
FIG. 6 is a schematic view for explaining an addendum and a dedendum of the gear.

FIG. 6 is a schematic view of the addendum $f_{ha} \cdot m$ and the dedendum fhd$\cdot$m of the gear. As illustrated in FIG. 6, in this embodiment, the addendum of the gear is expressed by $f_{ha} \cdot m$, and the dedendum of the gear is expressed by fhd$\cdot$m.

In this embodiment, it is preferable that at least any one of the internal gear 2 or the external gear 3 contain a resin material. This case can achieve the weight saving of the strain wave gear device and reduce the cost of the strain wave gear device.

As described above, when the meshing part P is provided at three or more positions, an increase in the rigidity against the torsion of the strain wave gear device as a whole causes the torsion of the strain wave gear device as a whole to be less likely to occur. Thus, when the meshing part P is provided at three or more positions, at least any one of the internal gear 2 or the external gear 3 can contain at least a resin material. In this case, at least any one of the internal gear 2 or the external gear 3 containing a resin material can achieve the weight saving of the strain wave gear device 1. In this case, at least any one of the internal gear 2 or the external gear 3 containing a resin material can also reduce the cost of the strain wave gear device 1.

The example of the resin material includes engineering plastics such as PEEK, PPS, and POM. The phrase "at least any one of the internal gear 2 or the external gear 3 contains a resin material" means allowing the combination of the resin material and a different material. For example, at least any one of the internal gear 2 or the external gear 3 can be formed of a composite material of the resin material and metal. Specifically, for example, the annular body and the teeth of the gear can be formed of materials that are different one another.

It is preferable that the teeth of at least any one of the internal gear 2 or the external gear 3 are subjected to a friction reduction treatment. This case can more improve the power transmission efficiency.

In this embodiment, a low friction layer can be provided on the surface of the internal teeth $2a$ by subjecting the internal teeth $2a$ of the internal gear 2 to low friction coating. The low friction layer can be formed of, for example, diamond-like carbon (DLC). When the teeth of the gear are subjected to the friction reduction treatment, Formula (1) and Formula (2) are considered with the dimensions after the friction reduction treatment.

The above exemplifies only one of the disclosed embodiments, and various modifications are possible according to the scope of the claims.

REFERENCE SIGNS LIST 1 strain wave gear device
2 internal gear
2a internal tooth
2b annular body
3 external gear
3a external tooth
3b annular body
4 wave generator
5 wave generation core
5a top
6 elastically deforming bearing
6a inner ring
6b outer ring
6c ball
O axis
P meshing part

The invention claimed is:

1. A strain wave gear device comprising:
an internal gear;
an external gear that has flexibility and is arranged at an inner circumference side of the internal gear; and
a wave generator that is assembled to an inner circumference of the external gear to cause the external gear to noncircularly deflect to form a meshing part with the internal gear in the external gear and to move the meshing part in a circumferential direction of the internal gear, wherein
the wave generator is configured such that the meshing part is formed at three or more positions in a circumferential direction of the external gear, and
in a state before the external gear is assembled to the wave generator, a value $(Dp_F/Z_F)$ obtained by dividing a working pitch diameter $Dp_F$ of the external gear by the number of teeth $Z_F$ of the external gear is greater than a value $(Dp_R/Z_R)$ obtained by dividing a working pitch diameter $Dp_R$ of the internal gear by the number of teeth $Z_R$ of the internal gear and
wherein
a tip diameter $Da_R$, a root diameter $Dd_R$, and the number of teeth $Z_R$ of the internal gear;
a tip diameter $Da_F$, a root diameter $Dd_F$, and the number of teeth $Z_F$ of the external gear; and
a lift amount D of a working pitch circle of the external gear, the lift amount D being generated by assembling the external gear to the wave generator, satisfy a relation of:

$$1 < \{Z_R \cdot (Da_R + Dd_R + Da_F + Dd_F - 4D)\} / \{Z_F \cdot (Da_R + Dd_R + Da_F + Dd_F + 4D)\} \leq 1.11.$$

2. The strain wave gear device according to claim 1, wherein at least one of the internal gear or the external gear contains a resin material.

3. The strain wave gear device according to claim 1, wherein teeth of at least one of the internal gear or the external gear are subjected to a friction reduction treatment.

4. The strain wave gear device according to claim 2, wherein teeth of at least one of the internal gear or the external gear are subjected to a friction reduction treatment.

* * * * *